(12) United States Patent
Tsai et al.

(10) Patent No.: US 10,502,872 B2
(45) Date of Patent: Dec. 10, 2019

(54) DISPLAY APPARATUS AND STRIP-SHAPED LENS

(71) Applicant: Coretronic Corporation, Hsin-Chu (TW)

(72) Inventors: Yi-Yu Tsai, Hsin-Chu (TW); Hsin-Hung Lee, Hsin-Chu (TW); Huei-Tzu Lin, Hsin-Chu (TW); Chiao-Chih Yang, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 30 days.

(21) Appl. No.: 15/390,529

(22) Filed: Dec. 25, 2016

(65) Prior Publication Data

US 2017/0192136 A1 Jul. 6, 2017

(30) Foreign Application Priority Data

Dec. 31, 2015 (TW) .............................. 104144570 A

(51) Int. Cl.
*G02B 3/08* (2006.01)
*G02B 7/02* (2006.01)
*G02B 27/10* (2006.01)

(52) U.S. Cl.
CPC ................. *G02B 3/08* (2013.01); *G02B 7/02* (2013.01); *G02B 27/1066* (2013.01)

(58) Field of Classification Search
CPC ........ G02B 3/08; G02B 7/02; G02B 27/1066; G02B 5/04; G09G 2300/026; G09G 2300/023; G06F 3/1446; G06F 3/1423; G06F 1/1624; G02F 1/13336; G02F 1/1335; G02F 1/133526; G02F 1/133308; G02F 1/133388; G02F 1/133322; G02F 2001/13356; G02F 2001/133331; G09F 9/30; H04N 13/0402; H04N 13/04
(Continued)

(56) References Cited

U.S. PATENT DOCUMENTS 8,797,234 B2 8/2014 Watanabe et al.
2011/0080665 A1 4/2011 Myers et al.
(Continued)

FOREIGN PATENT DOCUMENTS

CN 1467787 1/2004
CN 201181385 1/2009
(Continued)

*Primary Examiner* — Marin Pichler
(74) *Attorney, Agent, or Firm* — JCIPRNET

(57) ABSTRACT

A display apparatus including a first display unit, a second display unit and a strip-shaped lens is provided. The first display unit has a first display area and a first edge area. The second display unit has a second display area and a second edge area. The strip-shaped lens is disposed on a boundary of the first edge area and the second edge area. The strip-shaped lens includes a light entering surface, a light emitting surface, a first stairs-shaped surface and a second stairs-shaped surface. The first stairs-shaped surface is located above a part of the first display area adjacent to the boundary, and connects the light entering surface and the light emitting surface. The second stairs-shaped surface is located above a part of the second display area adjacent to the boundary, and connects the light entering surface and the light emitting surface.

22 Claims, 5 Drawing Sheets

(58) Field of Classification Search
USPC ........ 359/454–456, 458, 462–464, 466, 477; 345/1.1, 1.3, 4, 5
See application file for complete search history.

(56) References Cited

U.S. PATENT DOCUMENTS

| | | | |
|---|---|---|---|
| 2011/0102302 A1* | 5/2011 | Watanabe | G02F 1/13336 345/4 |
| 2013/0242230 A1 | 9/2013 | Watanabe | |
| 2015/0362638 A1* | 12/2015 | Wang | G02B 5/04 359/831 |
| 2017/0114971 A1* | 4/2017 | Cross | G06F 3/1446 |

FOREIGN PATENT DOCUMENTS

| | | |
|---|---|---|
| CN | 102067197 | 5/2011 |
| CN | 102081884 | 6/2011 |
| CN | 104062795 | 9/2014 |
| TW | 200916907 | 4/2009 |
| TW | 201009442 | 3/2010 |
| TW | 201039014 | 11/2010 |
| TW | I386597 | 2/2013 |
| TW | 201426688 | 7/2014 |
| TW | 201512734 | 4/2015 |

* cited by examiner

DISPLAY APPARATUS AND STRIP-SHAPED LENS

CROSS-REFERENCE TO RELATED APPLICATION

This application claims the priority benefit of Taiwan application serial no. 104144570, filed on Dec. 31, 2015. The entirety of the above-mentioned patent application is hereby incorporated by reference herein and made a part of this specification.

BACKGROUND OF THE INVENTION

Field of the Invention

The invention relates to a display apparatus and a lens, and particularly relates to a large-size display apparatus and a strip-shaped lens.

Description of Related Art

Large-size screen display system is widely applied in control rooms of a plurality of domains such as telecommunication network management, public security and traffic police command, traffic monitoring and management, military operational command training, industrial production scheduling, etc., and is adapted to centrally display signals of a plurality of different signal sources to satisfy user's requirement for displaying various sharing information and integrated information in an large area. Besides, related application for splicing a plurality of display screens to display a large-size image has appeared in various domains. Currently, in order to implement a large-size screen display system or a general display screen splicing, a common way is to splice a plurality of liquid crystal displays (LCDs) serving as display units.

After years of development, the LCDs have become a mainstream of today's displays. The LCD has advantages of thin thickness, lightweight, low power consumption, long service life, no radiation, and the LCD has fine and high-resolution display images, and various key indicators have an outstanding performance. However, although the LCD has the aforementioned advantages, based on an operation principle thereof, the LCD is still hard to avoid limitation of an invalid area and a front frame mechanism of a LCD panel. Therefore, when a plurality of the LCDs is adopted to implement multi-display screen splicing, the display images of the LCDs may have borders there between, which may cause discontinuity of an overall display and influence viewing quality. Therefore, it is necessary to provide a novel display apparatus to resolve the aforementioned problem of the existing LCDs.

The information disclosed in this "BACKGROUND OF THE INVENTION" section is only for enhancement of understanding of the background of the described technology and therefore it may contain information that does not form the prior art that is already known to a person of ordinary skill in the art. Further, the information disclosed in the "BACKGROUND OF THE INVENTION" section does not mean that one or more problems to be resolved by one or more embodiments of the invention was acknowledged by a person of ordinary skill in the art.

SUMMARY OF THE INVENTION

The invention is directed to a display apparatus. When a plurality of display units in the display apparatus is spliced, an image commonly displayed by the display units is continuous without interruption.

The invention is directed to a strip-shaped lens, which is adapted to be applied to a display apparatus. When a plurality of display units in the display apparatus is spliced, an image commonly displayed by the display units is continuous without interruption.

Other objects and advantages of the invention may be further illustrated by the technical features broadly embodied and described as follows.

In order to achieve one or a portion of or all of the objects or other objects, an embodiment of the invention provides a display apparatus including a first display unit, a second display unit and a strip-shaped lens. The first display unit has a first display area and a first edge area surrounding the first display area. The second display unit has a second display area and a second edge area surrounding the second display area. The first display unit and the second display unit are arranged side by side with each other through the first edge area and the second edge area. The strip-shaped lens is disposed on a boundary of the first edge area and the second edge area. The strip-shaped lens includes a light entering surface, a light emitting surface, a first stairs-shaped surface and a second stairs-shaped surface. The light entering surface faces the boundary and extends along the boundary, and extends from the boundary to above the first edge area and a part of the first display area adjacent to the boundary, and extends to above the second edge area and a part of the second display area adjacent to the boundary. The light emitting surface is opposite to the light entering surface and faces away from the boundary, and extends long the boundary, and extends from the boundary to above the first edge area and the part of the first display area adjacent to the boundary, and extends to above the second edge area and the part of the second display area adjacent to the boundary. The first stairs-shaped surface is located above the part of the first display area adjacent to the boundary, and connects the light entering surface and the light emitting surface. The second stairs-shaped surface is located above the part of the second display area adjacent to the boundary, and connects the light entering surface and the light emitting surface.

In order to achieve one or a portion of or all of the objects or other objects, an embodiment of the invention provides a strip-shaped lens including a light entering surface, a light emitting surface, a first stairs-shaped surface and a second stairs-shaped surface. The light entering surface faces a reference line and is located above the reference line, and extends along the reference line, and extends from the reference line to two sides. The light emitting surface is opposite to the light entering surface and faces away from the reference line, and extends long the reference line, and extends from the reference line to the two sides. The first stairs-shaped surface connects the light entering surface and the light emitting surface. The second stairs-shaped surface connects the light entering surface and the light emitting surface.

According to the above descriptions, the embodiments of the invention have at least one of following advantages or effects. The display apparatus according to the embodiments of the invention includes the strip-shaped lens disposed on the boundary of the first edge area and the second edge area. The light entering surface and the light emitting surface of the strip-shaped lens extend from the boundary to above the first edge area and a part of the first display area adjacent to the boundary, and extend to above the second edge area and a part of the second display area adjacent to the boundary. Moreover, the first stairs-shaped surface of the strip-shaped lens is located above the part of the first display area adjacent to the boundary, and the second stairs-shaped surface of the strip-shaped lens is located above the part of the second display area adjacent to the boundary. Therefore, the strip-shaped lens is adapted to be applied to the display apparatus, and after a plurality of display units in the display apparatus are spliced, an image commonly displayed by the display units is continuous without interruption, so as to achieve good display quality when a user views the display image of the display apparatus. Moreover, the strip-shaped lens is unnecessary to cover the entire display surfaces of the display units, and a volume of the strip-shaped lens is controlled to a low level under a premise that the display image is not distorted. In this way, material cost is decreased, and an overall weight of the display apparatus is not excessively high.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1A:
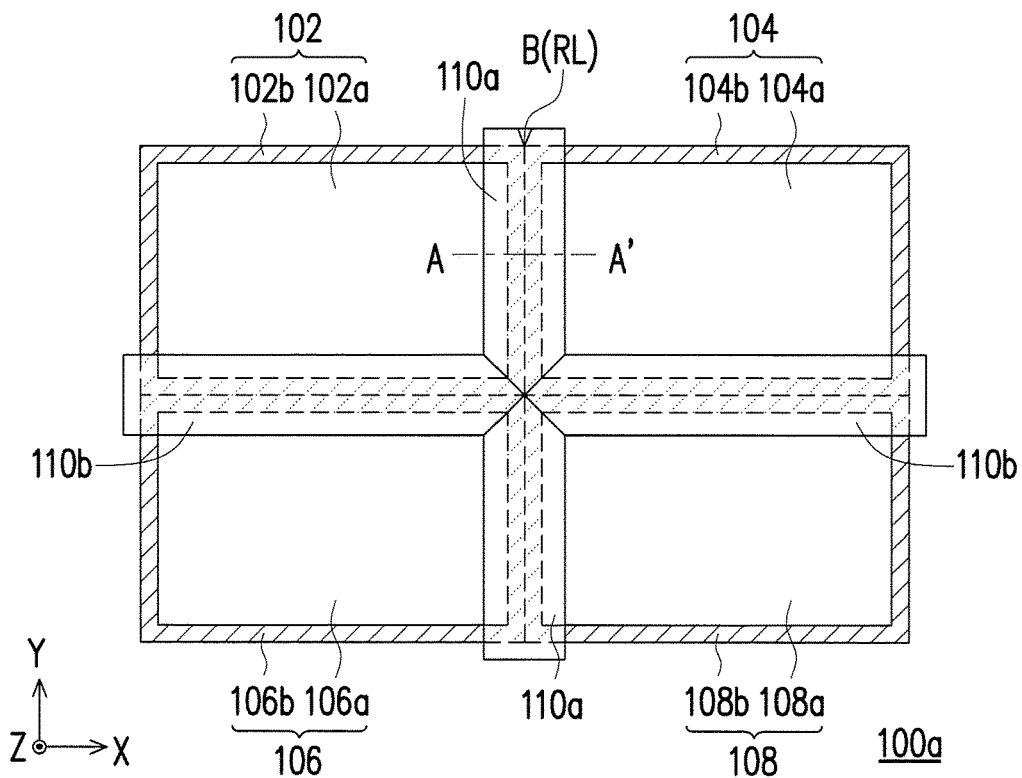
FIG. 1A is a front view of a display apparatus according to an embodiment of the invention.

FIG. 1A is a front view of a display apparatus according to an embodiment of the invention. Referring to FIG. 1A, in the embodiment, the display apparatus 100a may include a plurality of display units, for example, the display units may include a first display unit 102, a second display unit 104, a third display unit 106 and a fourth display unit 108. The first display unit 102 has a first display area 102a and a first edge area 102b surrounding the first display area 102a. The second display unit 104 has a second display area 104a and a second edge area 104b surrounding the second display area 104a. The third display unit 106 has a third display area 106a and a third edge area 106b surrounding the third display area 106a. The fourth display unit 108 has a fourth display area 108a and a fourth edge area 108b surrounding the fourth display area 108a. In detail, these display units are, for example, liquid crystal displays (LCDs). For example, the first display unit 102 is a LCD, the first display area 102a is a display area of the LCD, and the display area has a plurality of display pixels (not shown) for displaying display images. Moreover, the first edge area 102b is a non-display area of the LCD. In detail, the non-display area includes a frame area of the LCD and an invalid area of a LCD panel. In some embodiments, the display units of the display apparatus 100a may be other types of displays, for example, organic electroluminescent displays (which is also referred to as organic light-emitting diode (OLED) displays) or other suitable displays, etc. Moreover, the display units of the display apparatus 100a may be the same type of displays or different types of displays, which is not limited by the invention.

In the embodiment, the first display unit 102, the second display unit 104, the third display unit 106 and the fourth display unit 108 are, for example, spliced in an array of 2×2 to achieve a display effect of large-size display images. Namely, the display apparatus 100a of the embodiment is spliced by four display units. In detail, the first display unit 102 and the second display unit 104 are arranged side by side with each other through the first edge area 102b and the second edge area 104b, the third display unit 106 and the fourth display unit 108 are arranged side by side with each other through the third edge area 106b and the fourth edge area 108b, the first display unit 102 and the third display unit 106 are arranged side by side with each other through the first edge area 102b and the third edge area 106b, and the second display unit 104 and the fourth display unit 108 are arranged side by side with each other through the second edge area 104b and the fourth edge area 108b. However, in some embodiments, other number of the display units can be spliced, and the display units may adopt other splicing methods, which are not limited by the invention.

Figure 1B:
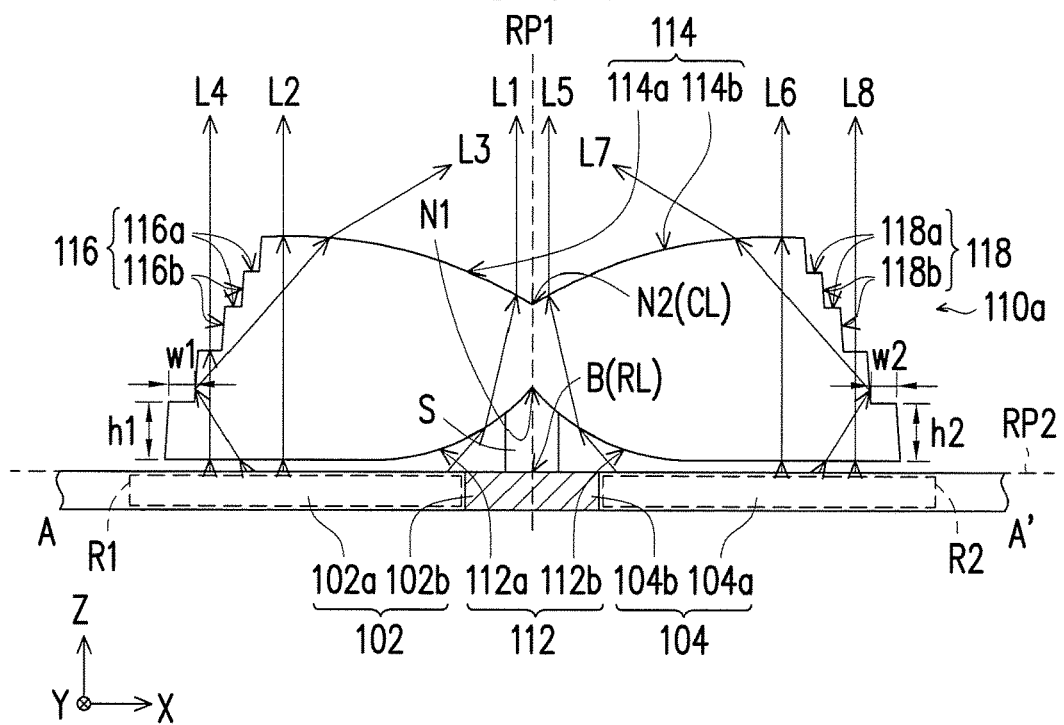
FIG. 1B is a cross-sectional view of the display apparatus of FIG. 1A along a line A-A'.

FIG. 1B is a cross-sectional view of the display apparatus of FIG. 1A along a line A-A'. Referring to FIG. 1A and FIG. 1B, in the embodiment, the display apparatus 100a further includes a strip-shaped lens 110a, strip-shaped lens 110a is disposed on a boundary B of the first edge area 102b and the second edge area 104b. Moreover, the strip-shaped lens 110a is also disposed on a boundary of the third edge area 106b and the fourth edge area 108b. In detail, the strip-shaped lens 110a includes a light entering surface 112 and a light emitting surface 114. In the embodiment, a reference line RL is located at the boundary B. The display apparatus 100a is, for example, in a space constructed by a first axis X, a second axis Y and a third axis Z, where the reference line RL extends along the direction of the second axis Y. The direction of the first axis X is perpendicular to the direction of the second axis Y and extends along a horizontal direction, the direction of the third axis Z is perpendicular to the direction of the first axis X and perpendicular to the direction of the second axis Y, and the third axis Z extends along a vertical direction. In detail, the first display unit 102, the second display unit 104, the third display unit 106 and the fourth display unit 108 of the display apparatus 100a are mutually spliced on a same plane constructed by the first axis X and the second axis Y.

In the embodiment, the light entering surface 112 faces the boundary B (i.e. the reference line RL) and extends along the boundary B towards a direction of the second axis Y, and extends from the boundary B to above the first edge area 102b and a part of the first display area 102a adjacent to the boundary B, and extends to above the second edge area 104b and a part of the second display area 104a adjacent to the boundary B. In detail, the part of the first display area 102a adjacent to the boundary B is a region R1, and the part of the second display area 104a adjacent to the boundary B is a region R2. The light entering surface 112 is located above the first edge area 102b and above the second edge area 104b, and the light entering surface 112 is also located above the region R1 and above the region R2. Moreover, in the embodiment, the light emitting surface 114 is opposite to the light entering surface 112 and faces away from the boundary B. The light emitting surface 114 extends along the boundary B towards the direction of the second axis Y, and extends from the boundary B to above the first edge area 102b and the part of the first display area 102a adjacent to the boundary B, and extends to above the second edge area 104b and the part of the second display area 104a adjacent to the boundary B. In detail, the light emitting surface 114 is located above the first edge area 102b and above the second edge area 104b, and the light emitting surface 114 is also located above the region R1 and above the region R2.

In the embodiment, the light entering surface 112 includes a first curved convex 112a and a second curved convex 112b. The first curved convex 112a extends from a place adjacent to the boundary B to above the first edge area 102b and the part of the first display area 102a adjacent to the boundary B, and the second curved convex 112b extends from a place adjacent to the boundary B to above the second edge area 104b and the part of the second display area 104a adjacent to the boundary B. A notch N1 is formed between the first curved convex 112a and the second curved convex 112b. Moreover, the light emitting surface 114 includes a third curved convex 114a and a fourth curved convex 114b. The third curved convex 114a extends from a place adjacent to the boundary B to above the first edge area 102b and the part of the first display area 102a adjacent to the boundary B, and the fourth curved convex 114b extends from a place adjacent to the boundary B to above the second edge area 104b and the part of the second display area 104a adjacent to the boundary B. A notch N2 is formed between the third curved convex 114a and the fourth curved convex 114b. In detail, the first curved convex 112a extends from a place adjacent to the reference line RL towards a first direction, and the third curved convex 114a also extends from a place adjacent to the reference line RL towards the first direction. Moreover, the second curved convex 112b extends from a place adjacent to the reference line RL towards a second direction, and the fourth curved convex 114b also extends from a place adjacent to the reference line RL towards the second direction, where the first direction is opposite to the second direction, and the first direction and the second direction are parallel to the direction of the first axis X. It should be noted that a curvature of the light entering surface 112 may be different to a curvature of the light emitting surface 114, i.e. a curvature of the first curved convex 112a may be different to a curvature of the third curved convex 114a, and a curvature of the second curved convex 112b may be different to a curvature of the fourth curved convex 114b. In this way, a volume of the strip-shaped lens 110a may be further decreased. However, the invention is not limited thereto, and the curvature of the light entering surface 112 may be the same to the curvature of the light emitting surface 114 to decrease design difficulty of the strip-shaped lens 110a.

In the embodiment, an area of an orthogonal projection of the light entering surface 112 on a plane containing the first display area 102a and the second display area 104a is larger than and covers an area of an orthogonal projection of the light emitting surface 114 on the plane. In detail, the light emitting surface 114 has a central line CL, and the central line CL is located at the notch N2. The space where the display apparatus 100a is located has a first reference plane RP1 and a second reference plane RP2. The first reference plane RP1 includes the central line CL and the reference line RL, and the second reference plane RP2 includes the reference line RL and is perpendicular to the first reference plane RP1. A YZ plane constructed by the second axis Y and the third axis Z is parallel to the first reference plane RP1, and an XY plane constructed by the first axis X and the second axis Y is parallel to the second reference plane RP2. The area of the orthogonal projection of the light entering surface 112 on the second reference plane RP2 is larger than and covers the area of the orthogonal projection of the light emitting surface 114 on the second reference plane RP2. Moreover, in some embodiments, an area of an orthogonal projection of the light emitting surface 114 on the plane containing the first display area 102a and the second display area 104a is larger than and covers an area of an orthogonal projection of the light entering surface 112 on the plane. Namely, the area of the orthogonal projection of the light emitting surface 114 on the second reference plane RP2 is larger than and covers the area of the orthogonal projection of the light entering surface 112 on the second reference plane RP2, though the invention is not limited thereto.

In the embodiment, the strip-shaped lens 110a of the display apparatus 100a may be selectively configured with a support portion S, and the support portion S is connected to the light entering surface 112, and leans against the boundary B, and extends along the direction of the second axis Y towards the reference line RL. In detail, the support portion S is used for supporting the strip-shaped lens 110a to fix the strip-shaped lens 110a to the boundary B of the first edge area 102b and the second edge area 104b. In a related embodiment, the support portion S and the strip-shaped lens 110a may be separately formed or formed integrally, and the support portion S is, for example, connected to the boundary B through a double-sided adhesive, an optical clear adhesive, or other suitable manner, and a connecting manner between the support portion S and the boundary B is not limited by the invention.

Referring to FIG. 1B, in the embodiment, the display apparatus 100a further includes a first stairs-shaped surface 116 and a second stairs-shaped surface 118. The first stairs-shaped surface 116 is located above the part of the first display area 102a adjacent to the boundary B, and connects the light entering surface 112 and the light emitting surface 114. The second stairs-shaped surface 118 is located above the part of the second display area 104a adjacent to the boundary B, and connects the light entering surface 112 and the light emitting surface 114. Namely, the first stairs-shaped surface 116 is located above the region R1, and the second stairs-shaped surface 118 is located above the region R2. In the embodiment, each of the first stairs-shaped surface 116 and the second stairs-shaped surface 118 includes a plurality of step surfaces parallel to the first display area 102a and the second display area 104a and a plurality of connection surfaces connected between the step surfaces. For example, the first stairs-shaped surface 116 includes a plurality of step surfaces 116a and a plurality of connection surfaces 116b. Each of the step surfaces 116a is parallel to the first display area 102a and the second display area 104a. Each of the connection surfaces 116b is connected between the two step surfaces 116a. The second stairs-shaped surface 118 includes a plurality of step surfaces 118a and a plurality of connection surfaces 118b. Each of the step surfaces 118a is parallel to the first display area 102a and the second display area 104a. Each of the connection surfaces 118b is connected between the two step surfaces 118a (in FIG. 1B, several step surfaces 116a, 118a and several connection surfaces 116b and 118b are schematically illustrate, and the invention is not limited to the amounts of the step surfaces and the connection surfaces). In detail, the step surfaces 116a are perpendicular to the first reference plane RP1, and the step surfaces 118a are also perpendicular to the first reference plane RP1. In the embodiment, the connection surfaces 116b of the first stairs-shaped surface 116 are not perpendicular to the second reference plane RP2, and the connection surfaces 118b of the second stairs-shaped surface 118 are not perpendicular to the second reference plane RP2, so as to properly adjust a transmission path of light beams coming from the first display area 102a and the second display area 104a. However, in some embodiments, the connection surfaces 116b and the connection surfaces 118b may also be perpendicular to the second reference plane RP2. Alternatively, a part of the connection surfaces 116b and the connection surfaces 118b is perpendicular to the second reference plane RP2, though the invention is not limited thereto.

In the embodiment, the first stairs-shaped surface 116 and the second stairs-shaped surface 118 are all complied with $0.1 < w/h < 10$ to decrease an influence of the first edge area 102b and the second edge area 104b on the display image, where w is a width of each step of the first stairs-shaped surface 116 and the second stairs-shaped surface 118 along a direction parallel to the first display area 102a and the second display area 104a. Namely, w is a width of each step of the first stairs-shaped surface 116 and the second stairs-shaped surface 118 along a direction perpendicular to the first reference plane RP1. In detail, w1 is a width of each step of the first stairs-shaped surface 116 along the direction parallel to the first display area 102a and the second display area 104a, and w2 is a width of each step of the second stairs-shaped surface 118 along the direction parallel to the first display area 102a and the second display area 104a. Moreover, h is a height of each step of the first stairs-shaped surface 116 and the second stairs-shaped surface 118 along a direction perpendicular to the first display area 102a and the second display area 104a. Namely, h is a height of each step of the first stairs-shaped surface 116 and the second stairs-shaped surface 118 along a direction parallel to the first reference plane RP1 and perpendicular to the reference line RL. In detail, h1 is a height of each step of the first stairs-shaped surface 116 along the direction perpendicular to the first display area 102a and the second display area 104a, and h2 is a height of each step of the second stairs-shaped surface 118 along the direction perpendicular to the first display area 102a and the second display area 104a.

In the embodiment, the region R1 of the first display area 102a adjacent to the boundary B emits a light beam L1, a light beam L2, a light beam L3 and a light beam L4 to enter the strip-shaped lens 110a, and the region R2 of the second display area 104a adjacent to the boundary B emits a light beam L5, a light beam L6, a light beam L7 and a light beam L8 to enter the strip-shaped lens 110a. The light beam L1, the light beam L2, the light beam L3 and the light beam L4, for example, penetrate through pixels of the first display area 102a and are emitted by the first display area 102a facing the light entering surface 112 of the strip-shaped lens 110a, and the light beam L5, the light beam L6, the light beam L7 and the light beam L8, for example, penetrate through pixels of the second display area 104a and are emitted by the second display area 104a facing the light entering surface 112 of the strip-shaped lens 110a. In detail, a distance between the boundary B and an emitting position of the light beam L2 on the region R1 is greater than a distance between the boundary B and an emitting position of the light beam L1 on the region R1; a distance between the boundary B and an emitting position of the light beam L3 on the region R1 is greater than the distance between the boundary B and the emitting position of the light beam L2 on the region R1; and distance between the boundary B and an emitting position of the light beam L4 on the region R1 is greater than the distance between the boundary B and the emitting position of the light beam L3 on the region R1. Moreover, a distance between the boundary B and an emitting position of the light beam L6 on the region R2 is greater than a distance between the boundary B and an emitting position of the light beam L5 on the region R2; a distance between the boundary B and an emitting position of the light beam L7 on the region R2 is greater than the distance between the boundary B and the emitting position of the light beam L6 on the region R2; and a distance between the boundary B and an emitting position of the light beam L8 on the region R2 is greater than the distance between the boundary B and the emitting position of the light beam L7 on the region R2.

In the embodiment, the light beam L1 is obliquely incident on the strip-shaped lens 110a through the first curved convex 112a relative to the third axis Z. Then, the light beam L1 is emitted out from the strip-shaped lens 110a through the third curved convex 114a. During the process that the light beam L1 enters and leaves the strip-shaped lens 110a, the light beam L1 is refracted to be about parallel to the first reference plane RP1, and the light beam L1 departs from the strip-shaped lens 110a along the third axis Z from above the first edge area 102b. Moreover, the light beam L2 is incident on the first curved convex 112a along a direction perpendicular to the XY plane, and is emitted out from the strip-shaped lens 110a through the third curved convex 114a. Moreover, the light beam L3 is obliquely incident on the strip-shaped lens 110a through the first curved convex 112a relative to the third axis Z, and has a total internal reflection (TIR) at the connection surface 116b, and is obliquely transmitted to the third curved convex 114a. Then, the light beam L3 is refracted at the third curved convex 114a and obliquely emitted out of the strip-shaped lens 110a relative to the third axis Z. Besides, the light beam L4 is incident on the first curved convex 112a along the direction perpendicular to the XY plane, and emitted out from the strip-shaped lens 110a through the step surface 116a. It should be noted that the first curved convex 112a and the second curved convex 112b of the embodiment are mirror symmetric relative to the boundary B, and the third curved convex 114a and the fourth curved convex 114b are also mirror symmetric relative to the boundary B, so as to decrease a design difficulty of the strip-shaped lens 110a. However, the invention is not limited thereto, and the first curved convex 112a and the second curved convex 112b may be non-mirror symmetric relative to the boundary B, and the third curved convex 114a and the fourth curved convex 114b may also be non-mirror symmetric relative to the boundary B, so as to cope with various display units with different frame sizes.

In the embodiment, the light beam L5 is obliquely incident on the strip-shaped lens 110a through the second curved convex 112b relative to the third axis Z, and the light beam L1 is emitted out from the strip-shaped lens 110a through the fourth curved convex 114b. During the process that the light beam L5 enters and leaves the strip-shaped lens 110a, the light beam L5 is refracted to be about parallel to the first reference plane RP1, and the light beam L5 departs from the strip-shaped lens 110a along the third axis Z from above the second edge area 104b. Moreover, the light beam L6 is incident on the second curved convex 112b along a direction perpendicular to the XY plane, and emitted out from the strip-shaped lens 110a through the fourth curved convex 114b. Moreover, the light beam L7 is obliquely incident on the strip-shaped lens 110a through the second curved convex 112b relative to the third axis Z, and has a TIR at the connection surface 118b, and is obliquely transmitted to the fourth curved convex 114b. Then, the light beam L7 is refracted at the fourth curved convex 114b and obliquely emitted out of the strip-shaped lens 110a relative to the third axis Z. Besides, the light beam L8 is incident on the second curved convex 112b along the direction perpendicular to the XY plane, and emitted out from the strip-shaped lens 110a through the step surface 118a.

In the embodiment, the light beam L1, the light beam L2, the light beam L4, the light beam L5, the light beam L6 and the light beam L8 are emitted out of the strip-shaped lens 110a along the direction of the third axis Z. Therefore, when a user views the display apparatus 100a in a normal usage manner along a direction parallel to the third axis Z from one side of the light emitting surface 114, the user may view the light beam L1 from above the first edge area 102b, and the user may view the light beam L5 from above the second edge area 104b. In detail, when a proper distance is kept between the eyes of the user and the display apparatus 100a to facilitate the user viewing a whole display image of all of the display units of the display apparatus 100a, the user may view the display image on the first edge area 102b and the second edge area 104b. Therefore, the user does not view the first edge area 102b and the second edge area 104b. In the embodiment, although the light beam L3 and the light beam L7 are obliquely emitted out of the strip-shaped lens 110a relative to the third axis Z (the light beam L3 and the light beam L7 are not emitted out of the strip-shaped lens 110a along the direction of the third axis Z), since the first stairs-shaped surface 116 has a plurality of connection surfaces 116b, and the second stairs-shaped surface 118 also has a plurality of connection surfaces 118b, the number of pixels corresponding to an emitting position of the light beam L3 on the region R1 is relatively less, and the number of pixels corresponding to an emitting position of the light beam L7 on the region R2 is also relatively less. Therefore, when the user views the display apparatus 100a in the normal usage manner along a direction parallel to the third axis Z, the user does not perceive the pixels corresponding to the light beam L3 and the pixels corresponding to the light beam L7, and the light beams emitted from these pixels do not enter the eyes of the user. In detail, the image commonly displayed by the first display unit 102 and the second display unit 104 is continuous without interruption.

Referring to FIG. 1A and FIG. 1B, in the embodiment, the display apparatus 100a further includes a strip-shaped lens 110b disposed on a boundary of the first edge area 102b and the third edge area 106b, and disposed on a boundary of the second edge area 104b and the fourth edge area 108b. The strip-shaped lens 110b is similar to the strip-shaped lens 110a, and components and related descriptions of the strip-shaped lens 110b may refer to the components and related descriptions of the strip-shaped lens 110a, which are not repeated. In detail, one end of the strip-shaped lenses 110a and 110b presents an isosceles right-angle prism shape, such that the two strip-shaped lenses 110a and the two strip-shaped lenses 110b may be spliced at the boundaries of the first edge area 102b, the second edge area 104b, the third edge area 106b and the fourth edge area 108b without producing a fissure, and a splicing part of the strip-shaped lenses 110a and the strip-shaped lenses 110b (in the embodiment, two strip-shaped lenses 110a and two strip-shaped lenses 110b are taken as an example for description, though the invention is not limited to the number of the strip-shaped lenses) may still maintain good viewing quality. Moreover, the strip-shaped lenses 110a and the strip-shaped lenses 110b may also be designed in other pattern for mutual splicing, which is not limited by the invention. Since the display apparatus 100a includes the strip-shaped lenses 110a and the strip-shaped lenses 110b, when the user views the display apparatus 100a in the normal usage manner, the image commonly displayed by the first display unit 102, the second display unit 104, the third display unit 106 and the fourth display unit 108 of the display apparatus 100a is continuous without interruption, such that the display image of the display apparatus 100a has good viewing quality. Besides, the strip-shaped lenses 110a and the strip-shaped lenses 110b are unnecessary to cover entire display surfaces of the display units, such that an overall weight of the display apparatus 100a is not excessively high. In detail, under a premise that the display image is not distorted, the size of the strip-shaped lenses 110a and the size of the strip-shaped lenses 110b of the display apparatus 100a are controlled to be smaller, such that material cost is decreased and the overall weight of the display apparatus 100a is not excessively high.

Figure 1C:
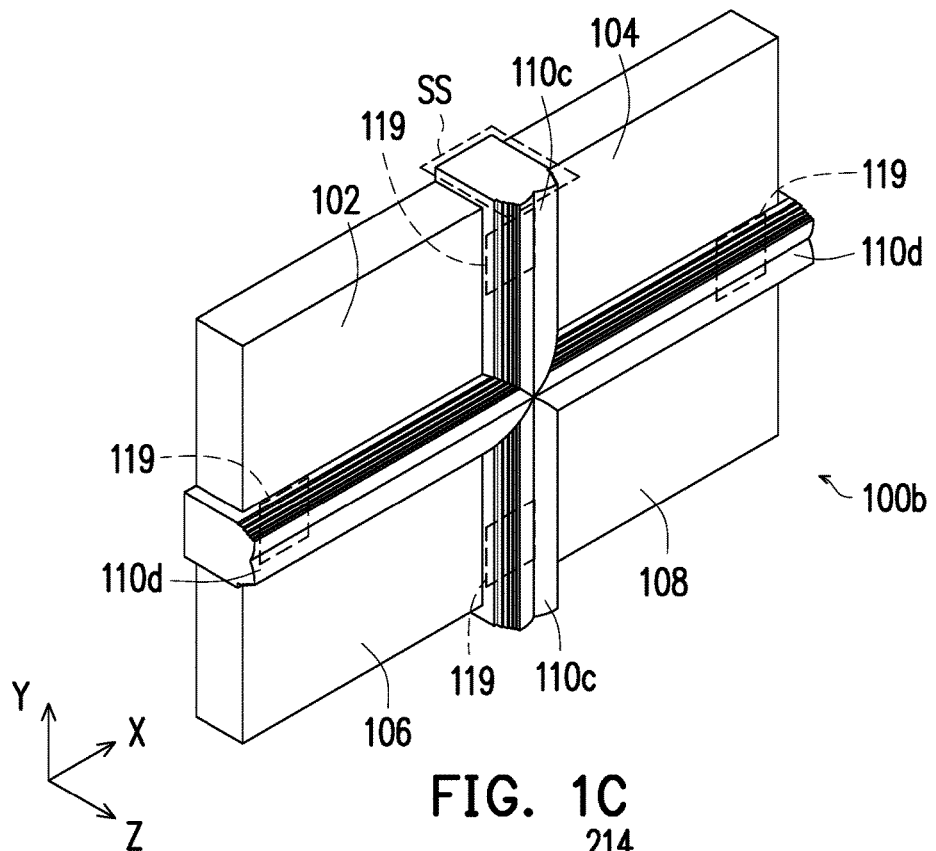
FIG. 1C is a schematic diagram of a strip-shaped lens fixed to a display apparatus through a buckle structure according to another embodiment of the invention.

FIG. 1C is a schematic diagram of a strip-shaped lens fixed to a display apparatus through a buckle structure according to another embodiment of the invention. Referring to FIG. 1C, in the embodiment, the display apparatus 100b is similar to the display apparatus 100a of the embodiment of FIG. 1A. Components and related descriptions of the display apparatus 100b may refer to the components and related descriptions of the display apparatus 100a of FIG. 1A, which are not repeated. A difference between the display apparatus 100b and the display apparatus 100a is that the display apparatus 100b includes two strip-shaped lenses 110c respectively disposed on the boundary of the first display unit 102 and the second display unit 104 and the boundary of the third display unit 106 and the fourth display unit 108. In the embodiment, the strip-shaped lens 110c disposed on the boundary of the first display unit 102 and the second display unit 104 has a buckle structure SS for connecting at least one of the first edge area of the first display unit 102 and the second edge area of the second display unit 104. In detail, the other strip-shaped lens 110c disposed on the boundary of the third display unit 106 and the fourth display unit 108 also has a buckle structure (not shown in FIG. 1C) for connecting at least one of the third edge area of the third display unit 106 and the fourth edge area of the fourth display unit 108. The buckle structure SS is located at one end of the strip-shaped lens 110c along the direction of the second axis Y for providing a buckling strength, so as to fix the strip-shaped lens 110c to the display apparatus 100b.

In the embodiment, the strip-shaped lens 110c may also be configured with a magnetic unit 119 for connecting at least one of the first edge area of the first display unit 102 and the second edge area of the second display unit 104 through a magnetic force. In detail, the other strip-shaped lens 110c may also be configured with a magnetic unit 119 for connecting at least one of the third edge area of the third display unit 106 and the fourth edge area of the fourth display unit 108 through a magnetic force. The magnetic unit 119 may be embedded in the strip-shaped lens 110c, or the magnetic unit 119 can be adhered on the strip-shaped lens 110c. The magnetic unit 119 is, for example, a magnet. The edge area corresponding to the magnetic unit 119 is, for example, a frame area of the display apparatus 100b, which may be configured with a magnet attracted to the magnetic unit 119 or a ferromagnetic metal material such as iron, cobalt, nickel, etc., such that the strip-shaped lens 110c may be fixed on the display apparatus 100b through the magnetic force. In some embodiments, the magnetic unit may be selectively disposed in the buckle structure SS of the strip-shaped lens 110c, though the invention is not limited thereto. In the embodiment, the display apparatus 100b further includes two strip-shaped lenses 110d respectively disposed on the boundary of the first display unit 102 and the third display unit 106 and the boundary of the second display unit 104 and the fourth display unit 108. Each of the strip-shaped lenses 110d may also include a buckle structure and a magnetic unit 119 for fixing the strip-shaped lens 110d to the display apparatus 100b. Moreover, a splicing manner of each of the strip-shaped lenses 110c and 110d is also similar to that of the strip-shaped lenses 110a and 110b, and a detail thereof is not repeated.

Figure 2:
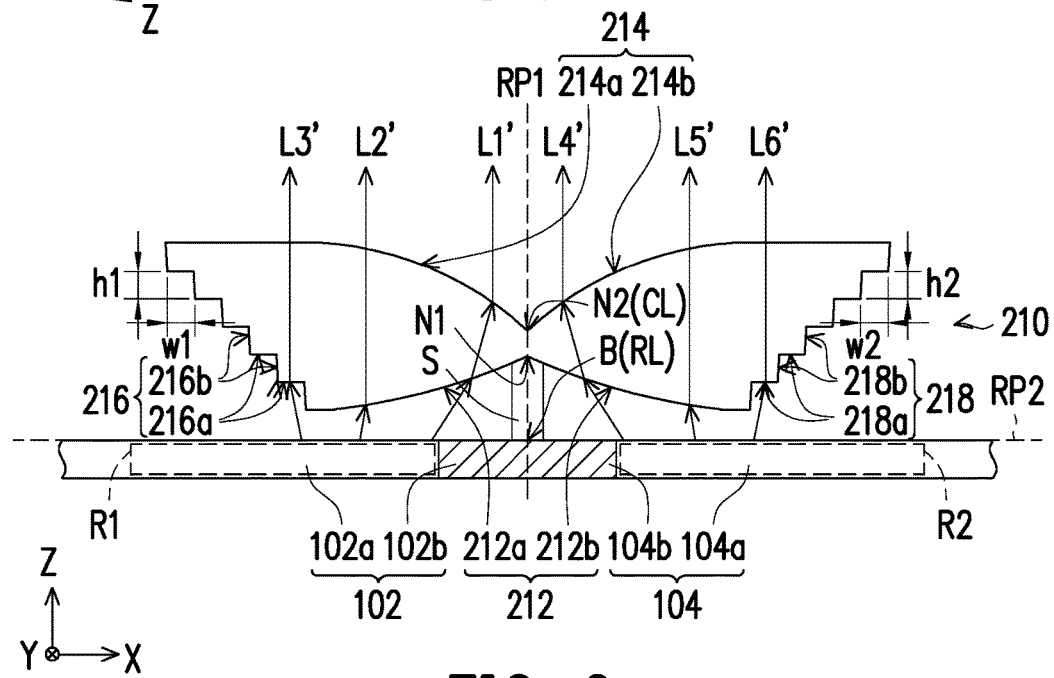
FIG. 2 is a cross-sectional view of a strip-shaped lens configured to a display apparatus according to still another embodiment of the invention.

FIG. 2 is a cross-sectional view of a strip-shaped lens configured to a display apparatus according to still another embodiment of the invention. Referring to FIG. 2, in the embodiment, the strip-shaped lens 210 is similar to the strip-shaped lens 110a of the embodiment of FIG. 1A and FIG. 1B. Components and related descriptions of the strip-shaped lens 210 may refer to the components and related descriptions of the strip-shaped lens 110a of the embodiment of FIG. 1A and FIG. 1B, which are not repeated. A difference between the strip-shaped lens 210 and the strip-shaped lens 110a is that an area of an orthogonal projection of a light emitting surface 214 on a plane containing the first display area 102a and the second display area 104a is larger than and covers an area of an orthogonal projection of a light entering surface 212 on the plane. Therefore, compared to the aforementioned strip-shaped lens 110a, the strip-shaped lens 210 may cover the first edge area 102b and the second edge area 104b with a wider width along the direction of the first axis X. Moreover, a first stairs-shaped surface 216 of the strip-shaped lens 210 includes a plurality of step surfaces 216a parallel to the first display area 102a and the second display area 104a and a plurality of connection surfaces 216b connected between the step surfaces 216a. A second stairs-shaped surface 218 of the strip-shaped lens 210 includes a plurality of step surfaces 218a parallel to the first display area 102a and the second display area 104a and a plurality of connection surfaces 218b connected between the step surfaces 218a.

In the embodiment, the region R1 of the first display area 102a adjacent to the boundary B emits a light beam L1', a light beam L2' and a light beam L3' to enter the strip-shaped lens 210, and the region R2 of the second display area 104a adjacent to the boundary B emits a light beam L4', a light beam L5' and a light beam L6' to enter the strip-shaped lens 210. In detail, a distance between the boundary B and an emitting position of the light beam L2' on the region R1 is greater than a distance between the boundary B and an emitting position of the light beam L1' on the region R1; and a distance between the boundary B and an emitting position of the light beam L3' on the region R1 is greater than the distance between the boundary B and the emitting position of the light beam L2' on the region R1. Moreover, a distance between the boundary B and an emitting position of the light beam L5' on the region R2 is greater than a distance between the boundary B and an emitting position of the light beam L4' on the region R2; and a distance between the boundary B and an emitting position of the light beam L6' on the region R2 is greater than the distance between the boundary B and the emitting position of the light beam L5' on the region R2.

In the embodiment, a transmission path of the light beam L1' is similar to that of the light beam L1 in the embodiment of FIG. 1B. The light beam L1' is obliquely incident on the strip-shaped lens 210 through a first curved convex 212a relative to the third axis Z, and emitted out from the strip-shaped lens 210 through a third curved convex 214a. The light beam L2' is incident on the strip-shaped lens 210 through the first curved convex 212a in slight obliquity relative to the third axis Z, and emitted out from the strip-shaped lens 210 through the third curved convex 214a. The light beam L2' may also be incident on the first curved convex 212a along a direction perpendicular to the XY plane, and emitted out from the strip-shaped lens 210 through the third curved convex 214a. Moreover, the light beam L3' is obliquely incident on the strip-shaped lens 210 through the step surface 216a relative to the third axis Z, and is refracted and transmitted to the third curved convex 214a along a direction perpendicular to or nearly perpendicular to the XY plane, and is emitted out of the strip-shaped lens 210 through the third curved convex 214a. The light beam L4' is obliquely incident on the strip-shaped lens 210 through a second curved convex 212b relative to the third axis Z, and emitted out from the strip-shaped lens 210 through a fourth curved convex 214b. The light beam L5' is incident on the strip-shaped lens 210 through the second curved convex 212b in slight obliquity relative to the third axis Z, and emitted out from the strip-shaped lens 210 through the fourth curved convex 214b. The light beam L5' may also be incident on the second curved convex 212b along the direction perpendicular to the XY plane, and emitted out from the strip-shaped lens 210 through the fourth curved convex 214b. Moreover, the light beam L6' is obliquely incident on the strip-shaped lens 210 through the step surface 218a relative to the third axis Z, and is refracted and transmitted to the fourth curved convex 214b along a direction perpendicular to or nearly perpendicular to the XY plane, and is emitted out of the strip-shaped lens 210 through the fourth curved convex 214b.

In the embodiment, the light beam L1', the light beam L2', the light beam L3', the light beam L4', the light beam L5' and the light beam L6' are emitted out of the strip-shaped lens 210 along the direction of the third axis Z. Therefore, when the user views the display apparatus in a normal usage manner along a direction parallel to the third axis Z from one side of the light emitting surface 214, the user may view the light beam L1' from above the first edge area 102b, and the user may view the light beam L4' from above the second edge area 104b. In detail, the display apparatus of the embodiment may achieve an effect similar to that of the display apparatus 100a of the embodiment of FIG. 1A and FIG. 1B, and in the display apparatus of the embodiment, the image commonly displayed by the first display unit 102 and the second display unit 104 is continuous without interruption.

Figure 3:
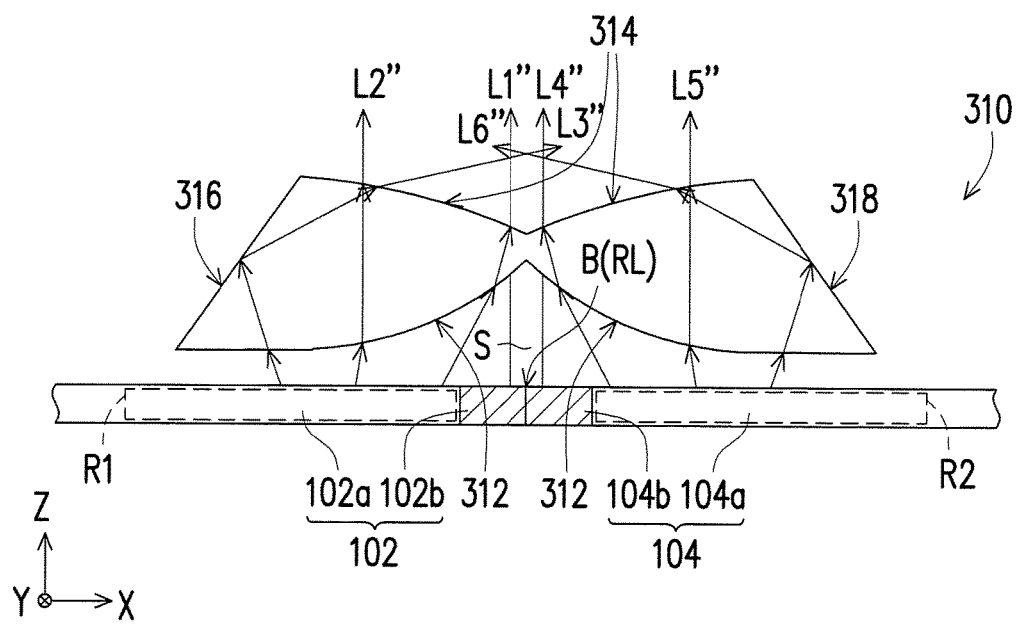
FIG. 3 is a cross-sectional view of a strip-shaped lens configured to a display apparatus according to a comparison embodiment of the invention.

FIG. 3 is a cross-sectional view of a strip-shaped lens configured to a display apparatus according to a comparison embodiment of the invention. Referring to FIG. 3, in the comparison embodiment, the strip-shaped lens 310 is similar to the strip-shaped lens 110a of the embodiment of FIG. 1A and FIG. 1B. Components and related descriptions of the strip-shaped lens 310 may refer to the components and related descriptions of the strip-shaped lens 110a of the embodiment of FIG. 1A and FIG. 1B, which are not repeated. A difference between the strip-shaped lens 310 and the strip-shaped lens 110a is that the strip-shaped lens 310 does not have the first stairs-shaped surface and the second stairs-shaped surface. The strip-shaped lens 310 includes a side surface 316 located above the part of the first display area 102a adjacent to the boundary B, and connects the light entering surface 312 and the light emitting surface 314. Moreover, the strip-shaped lens 310 further includes a side surface 318 located above the part of the second display area 104a adjacent to the boundary B, and connects the light entering surface 312 and the light emitting surface 314. In detail, the side surface 316 and the side surface 318 may be planes, arc surfaces, or curved surfaces.

In the comparison embodiment, the region R1 of the first display area 102a adjacent to the boundary B emits a light beam L1", a light beam L2" and a light beam L3" to enter the strip-shaped lens 310, and the region R2 of the second display area 104a adjacent to the boundary B emits a light beam L4", a light beam L5" and a light beam L6" to enter the strip-shaped lens 310. In detail, emitting positions of the light beam L1", the light beam L2", the light beam L3", the light beam L4", the light beam L5" and the light beam L6" are similar to the emitting positions of the light beam L1', the light beam L2', the light beam L3', the light beam L4', the light beam L5' and the light beam L6' of the embodiment of FIG. 2. In the comparison embodiment, a transmission path of the light beam L1" is similar to that of the light beam L1' in the embodiment of FIG. 2. The light beam L1" is obliquely incident on the strip-shaped lens 310 through a light entering surface 312 relative to the third axis Z, and emitted out from a light emitting surface 314. The light beam L2" is incident on the light entering surface 312 in slight obliquity relative to the third axis Z, and emitted out from the strip-shaped lens 310 through the light emitting surface 314. The light beam L2" may also be incident on the light entering surface 312 along a direction perpendicular to the XY plane, and emitted out from the strip-shaped lens 310 through the light emitting surface 314. Moreover, the light beam L3" is obliquely incident on the strip-shaped lens 310 through the light entering surface 312 relative to the third axis Z, and has a TIR at the side surface 316. Then, the light beam L3" is obliquely emitted out from the strip-shaped lens 310 through the light emitting surface 314 relative to the third axis Z. The light beam L4" is obliquely incident on the strip-shaped lens 310 through the light entering surface 312 relative to the third axis Z, and emitted out from the light emitting surface 314. The light beam L5" is incident on the light entering surface 312 in slight obliquity relative to the third axis Z, and emitted out from the strip-shaped lens 310 through the light emitting surface 314. The light beam L5" may also be incident on the light entering surface 312 along a direction perpendicular to the XY plane, and emitted out from the strip-shaped lens 310 through the light emitting surface 314. Moreover, the light beam L6" is obliquely incident on the strip-shaped lens 310 through the light entering surface 312 relative to the third axis Z, and has a TIR at the side surface 318. Then, the light beam L6" is obliquely emitted out from the strip-shaped lens 310 through the light emitting surface 314 relative to the third axis Z.

In the comparison embodiment, the light beam L1", the light beam L2", the light beam L4" and the light beam L5" are emitted out of the strip-shaped lens 310 along the direction of the third axis Z. When the user views the display apparatus in a normal usage manner along a direction parallel to the third axis Z from one side of the light emitting surface 314, the user may view the light beam L1" from above the first edge area 102b, and the user may view the light beam L4" from above the second edge area 104b. However, the light beam L3" and the light beam L6" are obliquely emitted out of the strip-shaped lens 310 relative to the third axis Z, and since an area of the side surface 316 is far greater than an area of the connection surface 116b of the strip-shaped lens 110a of FIG. 1B, the number of pixels corresponding to the emitting position of the light beam L3" on the region R1 is far greater than the number of pixels corresponding to the emitting position of the light beam L3 on the region R1 in the strip-shaped lens 110a, and since an area of the side surface 318 is far greater than an area of the connection surface 118b of the strip-shaped lens 110a of FIG. 1B, the number of pixels corresponding to the emitting position of the light beam L6" on the region R2 is far greater than the number of pixels corresponding to the emitting position of the light beam L6 on the region R2 in the strip-shaped lens 110a. Therefore, when the user views the display apparatus using the strip-shaped lens 310 of FIG. 3 in a normal usage manner, the user may perceive the pixels corresponding to the light beam L3" and the pixels corresponding to the light beam L6", and a part of the beams emitted by these pixels may enter the user's eyes. In detail, the user may observe existence of messy lines from the image commonly displayed by the first display unit 102 and the second display unit 104, such that the image commonly displayed by the first display unit 102 and the second display unit 104 is probably interrupted, distorted and non-continuous.

Referring to the embodiment of FIG. 1B while referring to the comparison embodiment of FIG. 3, in the embodiment of FIG. 1B, the light beam L3 only has the TIR on the connection surface 116b of the first stairs-shaped surface 116, and the light beam L7 only has the TIR on the connection surface 118b of the second stairs-shaped surface 118. Comparatively, in the comparison embodiment of FIG. 3, the light beams L3" and L6" respectively have the TIR at the side surface 316 and the side surface 318. In detail, in case that the light beams L3" and L6" have the TIR and are obliquely emitted out of the strip-shaped lens 310, the number of pixels corresponding to the light beams L3" and L6" is far more than the number of pixels corresponding to the light beams L3 and L7 of the embodiment of FIG. 1B in case that the light beams L3 and L7 have the TIR and are obliquely emitted out of the strip-shaped lens 110a. Namely, since the strip-shaped lens 110a of the embodiment of FIG. 1B has the first stairs-shaped surface 116 and the second stairs-shaped surface 118, compared to the comparison embodiment of FIG. 3, the image commonly displayed by the first display unit 102 and the second display unit 104 of the display apparatus 100a of the embodiment of FIG. 1B is continuous without interruption.

Figure 4:
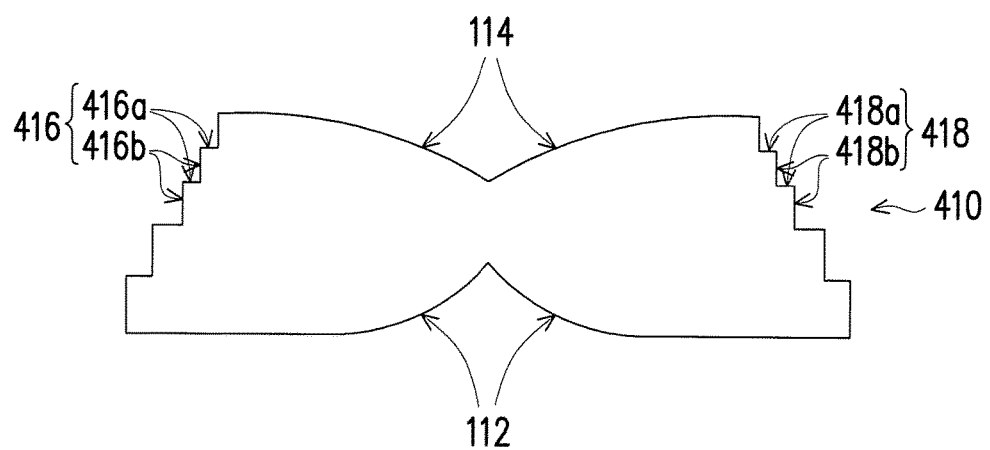
FIG. 4 is a cross-sectional view of a strip-shaped lens according to still another embodiment of the invention.

FIG. 4 is a cross-sectional view of a strip-shaped lens according to still another embodiment of the invention. Referring to FIG. 4, in the embodiment, the strip-shaped lens 410 is similar to the strip-shaped lens 110a of the embodiment of FIG. 1A and FIG. 1B, and components and related descriptions of the strip-shaped lens 410 may refer to the components and related descriptions of the strip-shaped lens 110a of the embodiment of FIG. 1A and FIG. 1B, which are not repeated. Moreover, the strip-shaped lens 410 may not have the support portion S, i.e. at least a part of the light entering surface 112 may be directly adhered to the first display area 102a and the second display area 104a (the first display area 102a and the second display area 104a are not illustrated in FIG. 4) through an adhesive such as a transparent double-sided adhesive or an optical adhesive, etc. A difference between the strip-shaped lens 410 of the embodiment and the aforementioned strip-shaped lens 110a is that the strip-shaped lens 410 includes a first stairs-shaped surface 416 and a second stairs-shaped surface 418. The first stairs-shaped surface 416 includes a plurality of step surfaces 416a and a plurality of connection surfaces 416b connected between the step surfaces 416a. The second stairs-shaped surface 418 includes a plurality of step surfaces 418a and a plurality of connection surfaces 418b connected between the step surfaces 418a. In detail, the step surfaces 416a are perpendicular to the connection surfaces 416b, and the step surfaces 418a are perpendicular to the connection surfaces 418b. In the embodiment, when the strip-shaped lens 410 is applied to the display apparatus 100a of FIG. 1A and FIG. 1B, the display apparatus 100a using the strip-shaped lens 410 may achieve the same effect as that of the display apparatus 100a of the embodiment of FIG. 1A and FIG. 1B.

Figure 5:
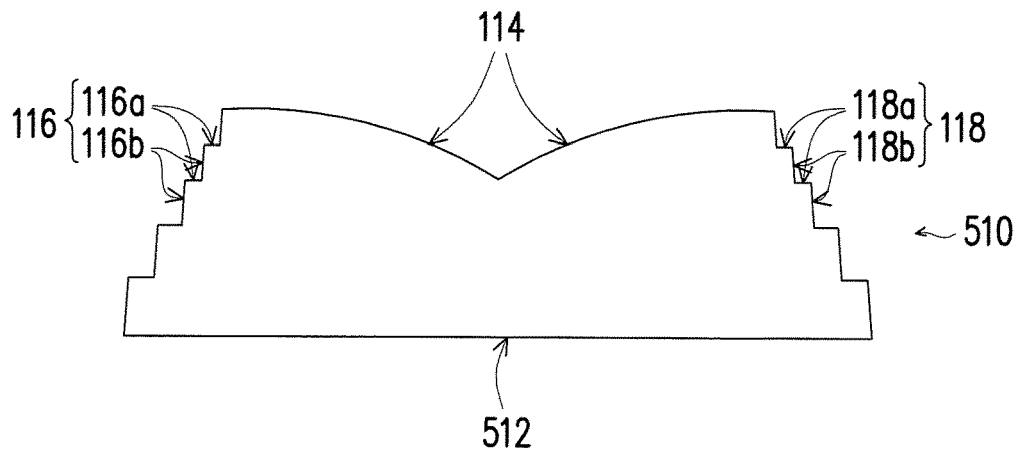
FIG. 5 is a cross-sectional view of a strip-shaped lens according to still another embodiment of the invention.

FIG. 5 is a cross-sectional view of a strip-shaped lens according to still another embodiment of the invention. Referring to FIG. 5, in the embodiment, the strip-shaped lens 510 is similar to the strip-shaped lens 110a of the embodiment of FIG. 1A and FIG. 1B, and components and related descriptions of the strip-shaped lens 510 may refer to the components and related descriptions of the strip-shaped lens 110a of the embodiment of FIG. 1A and FIG. 1B, which are not repeated. Moreover, the strip-shaped lens 510 may not have the support portion S, i.e. at least a part of the light entering surface 512 may be directly adhered to the first display area 102a and the second display area 104a (the first display area 102a and the second display area 104a are not illustrated in FIG. 5) through an adhesive such as a transparent double-sided adhesive or an optical adhesive, etc. A difference between the strip-shaped lens 510 of the embodiment and the aforementioned strip-shaped lens 110a is that the light entering surface 512 of the strip-shaped lens 510 is a plane, so as to decrease design difficulty of the strip-shaped lens 510. In the embodiment, when the strip-shaped lens 510 is applied to the display apparatus 100a of FIG. 1A and FIG. 1B, the display apparatus 100a using the strip-shaped lens 510 may achieve the same effect as that of the display apparatus 100a of the embodiment of FIG. 1A and FIG. 1B.

Figure 6:
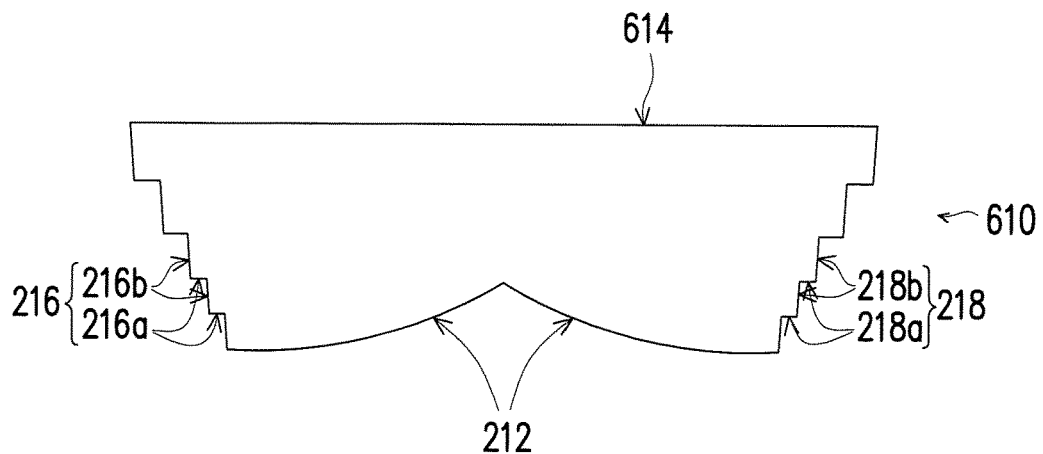
FIG. 6 is a cross-sectional view of a strip-shaped lens according to still another embodiment of the invention.

FIG. 6 is a cross-sectional view of a strip-shaped lens according to still another embodiment of the invention. Referring to FIG. 6, in the embodiment, the strip-shaped lens 610 is similar to the strip-shaped lens 210 of the embodiment of FIG. 2, and components and related descriptions of the strip-shaped lens 610 may refer to the components and related descriptions of the strip-shaped lens 210 of the embodiment of FIG. 2, which are not repeated. Moreover, the strip-shaped lens 610 may be selectively configured with the support portion S, and when the strip-shaped lens 610 does not have the support portion S, at least a part of the light entering surface 212 may be directly adhered to the first display area 102a and the second display area 104a (the first display area 102a and the second display area 104a are not illustrated in FIG. 6) through an adhesive such as a transparent double-sided adhesive or an optical adhesive, etc. A difference between the strip-shaped lens 610 of the embodiment and the aforementioned strip-shaped lens 210 is that a light emitting surface 614 of the strip-shaped lens 610 is a plane, so as to decrease design difficulty of the strip-shaped lens 610, and an area of an orthogonal projection of the light emitting surface 614 on a plane containing the first display area (not shown) and the second display area (not shown) is larger than and covers an area of an orthogonal projection of the light entering surface 212 on the plane. When the strip-shaped lens 610 is applied to the display apparatus of FIG. 2, the display apparatus using the strip-shaped lens 610 may achieve the same effect as that of the display apparatus of the embodiment of FIG. 2.

Figure 7:
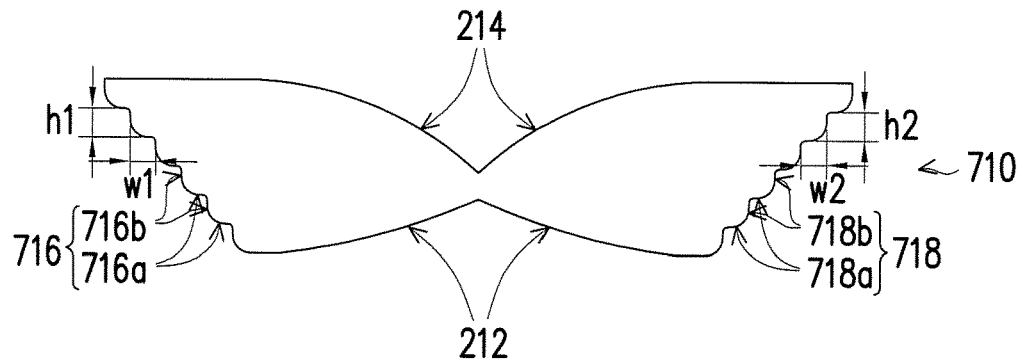
FIG. 7 is a cross-sectional view of a strip-shaped lens according to still another embodiment of the invention.

FIG. 7 is a cross-sectional view of a strip-shaped lens according to still another embodiment of the invention. Referring to FIG. 7, in the embodiment, the strip-shaped lens 710 is similar to the strip-shaped lens 210 of the embodiment of FIG. 2, and components and related descriptions of the strip-shaped lens 710 may refer to the components and related descriptions of the strip-shaped lens 210 of the embodiment of FIG. 2, which are not repeated. Moreover, the strip-shaped lens 710 may be selectively configured with the support portion S, and when the strip-shaped lens 710 does not have the support portion S, at least a part of the light entering surface 212 may be directly adhered to the first display area 102a and the second display area 104a (the first display area 102a and the second display area 104a are not illustrated in FIG. 7) through an adhesive such as a transparent double-sided adhesive or an optical adhesive, etc. A difference between the strip-shaped lens 710 of the embodiment and the aforementioned strip-shaped lens 210 is that the strip-shaped lens 710 includes a first stairs-shaped surface 716 and a second stairs-shaped surface 718. The first stairs-shaped surface 716 includes a plurality of step surfaces 716a and a plurality of connection surfaces 716b connected between the step surfaces 716a. The second stairs-shaped surface 718 includes a plurality of step surfaces 718a and a plurality of connection surfaces 718b connected between the step surfaces 718a. In detail, the difference between the strip-shaped lens 710 and the aforementioned strip-shaped lens 210 is that the adjacent step surface 716a and connection surface 716b are smoothly connected to form an arc-shape, and the adjacent step surface 718a and connection surface 718b are smoothly connected to form an arc-shape. For example, a material of the strip-shaped lens 710 is, for example, acrylic (e.g. polymethylmethacrylate (PMMA)), polycarbonate (PC) or other suitable transparent materials, and the strip-shaped lens 710 is manufactured through mold injection. Since the adjacent step surface 716a and connection surface 716b in the strip-shaped lens 710 are smoothly connected to form an arc-shape, and the adjacent step surface 718a and connection surface 718b are smoothly connected to form an arc-shape, during a process of the mold injection, a manufacturing yield of the first stairs-shaped surface 716 and the second stairs-shaped surface 718 of the strip-shaped lens 710 may be improved in demolding. In the embodiment, when the strip-shaped lens 710 is applied to the display apparatus of FIG. 2, the display apparatus using the strip-shaped lens 710 may achieve the same effect as that of the display apparatus of the embodiment of FIG. 2.

Figure 8:
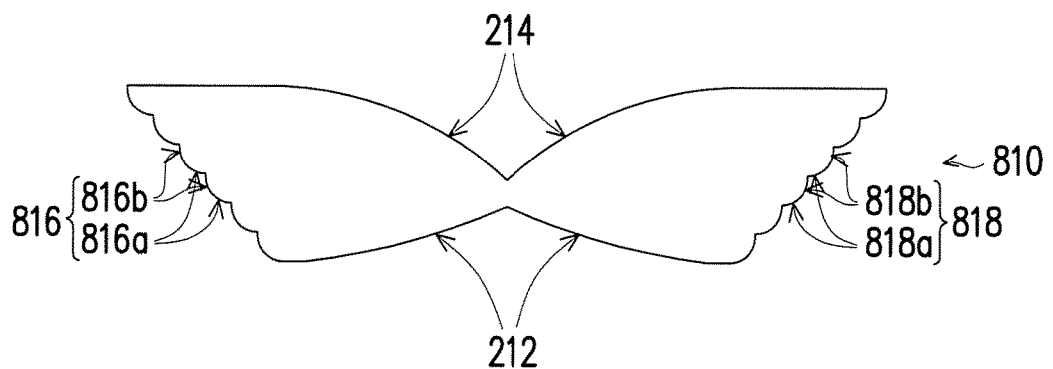
FIG. 8 is a cross-sectional view of a strip-shaped lens according to still another embodiment of the invention.

FIG. 8 is a cross-sectional view of a strip-shaped lens according to still another embodiment of the invention. Referring to FIG. 8, in the embodiment, the strip-shaped lens 810 is similar to the strip-shaped lens 210 of the embodiment of FIG. 2, and components and related descriptions of the strip-shaped lens 810 may refer to the components and related descriptions of the strip-shaped lens 210 of the embodiment of FIG. 2, which are not repeated. Moreover, the strip-shaped lens 810 may be selectively configured with the support portion S, and when the strip-shaped lens 810 does not have the support portion S, at least a part of the light entering surface 212 may be directly adhered to the first display area 102a and the second display area 104a (the first display area 102a and the second display area 104a are not illustrated in FIG. 7) through an adhesive such as a transparent double-sided adhesive or an optical adhesive, etc. A difference between the strip-shaped lens 810 of the embodiment and the aforementioned strip-shaped lens 210 is that the strip-shaped lens 810 includes a first stairs-shaped surface 816 and a second stairs-shaped surface 818. The first stairs-shaped surface 816 includes a plurality of step surfaces 816a and a plurality of connection surfaces 816b connected between the step surfaces 816a. The second stairs-shaped surface 818 includes a plurality of step surfaces 818a and a plurality of connection surfaces 818b connected between the step surfaces 818a. In detail, each of the step surfaces 816a and an adjacent connection surface 816b are smoothly connected to form an arc-shape, and commonly form a plurality of cylindrical surfaces protruding out of the strip-shaped lens 810. Moreover, each of the step surfaces 818a and an adjacent connection surface 818b are smoothly connected to form an arc-shape, and commonly form a plurality of cylindrical surfaces protruding out of the strip-shaped lens 810. In the embodiment, when the strip-shaped lens 810 is applied to the display apparatus of FIG. 2, the display apparatus using the strip-shaped lens 810 may achieve the same effect as that of the display apparatus of the embodiment of FIG. 2.

Figure 9:
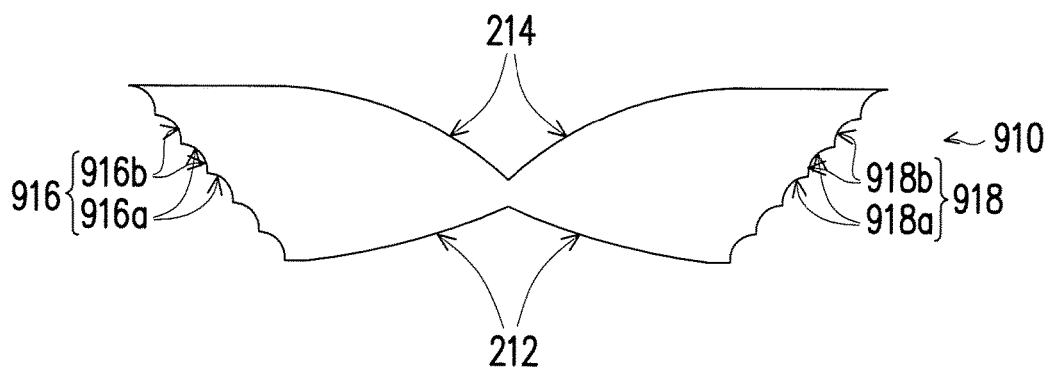
FIG. 9 is a cross-sectional view of a strip-shaped lens according to still another embodiment of the invention.

FIG. 9 is a cross-sectional view of a strip-shaped lens according to still another embodiment of the invention. Referring to FIG. 9, in the embodiment, the strip-shaped lens 910 is similar to the strip-shaped lens 210 of the embodiment of FIG. 2, and components and related descriptions of the strip-shaped lens 910 may refer to the components and related descriptions of the strip-shaped lens 210 of the embodiment of FIG. 2, which are not repeated. Moreover, the strip-shaped lens 910 may be selectively configured with the support portion S, and when the strip-shaped lens 910 does not have the support portion S, at least a part of the light entering surface 212 may be directly adhered to the first display area 102a and the second display area 104a (the first display area 102a and the second display area 104a are not illustrated in FIG. 9) through an adhesive such as a transparent double-sided adhesive or an optical adhesive, etc. A difference between the strip-shaped lens 910 of the embodiment and the aforementioned strip-shaped lens 210 is that the strip-shaped lens 910 includes a first stairs-shaped surface 916 and a second stairs-shaped surface 918. The first stairs-shaped surface 916 includes a plurality of step surfaces 916a and a plurality of connection surfaces 916b connected between the step surfaces 916a. The second stairs-shaped surface 918 includes a plurality of step surfaces 918a and a plurality of connection surfaces 918b connected between the step surfaces 918a. In detail, each of the step surfaces 916a and an adjacent connection surface 916b are smoothly connected to form an arc-shape, and commonly form a plurality of cylindrical surfaces recessed into the strip-shaped lens 910. Moreover, each of the step surfaces 918a and an adjacent connection surface 918b are smoothly connected to form an arc-shape, and commonly form a plurality of cylindrical surfaces recessed into the strip-shaped lens 910. In the embodiment, when the strip-shaped lens 910 is applied to the display apparatus of FIG. 2, the display apparatus using the strip-shaped lens 910 may achieve the same effect as that of the display apparatus of the embodiment of FIG. 2.

In summary, the embodiments of the invention have at least one of following advantages or effects. The display apparatus according to the embodiments of the invention includes the strip-shaped lens disposed on the boundary of the first edge area and the second edge area. The light entering surface and the light emitting surface of the strip-shaped lens extend from the boundary to above the first edge area and a part of the first display area adjacent to the boundary, and extend to above the second edge area and a part of the second display area adjacent to the boundary. Moreover, the first stairs-shaped surface of the strip-shaped lens is located above the part of the first display area adjacent to the boundary, and the second stairs-shaped surface of the strip-shaped lens is located above the part of the second display area adjacent to the boundary. Therefore, the strip-shaped lens is adapted to be applied to the display apparatus, and after a plurality of display units of the display apparatus are spliced, an image commonly displayed by the display units is continuous without interruption, so as to achieve good display quality when a user views the display image of the display apparatus. Moreover, the strip-shaped lens is unnecessary to cover the entire display surfaces of the display units, and a volume of the strip-shaped lens is controlled to a low level under a premise that the display image is not distorted. In this way, the material cost is decreased, and an overall weight of the display apparatus is not excessively high.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A display apparatus, comprising:
   a first display unit, having a first display area and a first edge area surrounding the first display area;
   a second display unit, having a second display area and a second edge area surrounding the second display area, wherein the first display unit and the second display unit are arranged side by side with each other through the first edge area and the second edge area; and
   a strip-shaped lens, disposed on a boundary of the first edge area and the second edge area, and the strip-shaped lens comprising:
      a light entering surface, facing the boundary and extending along the boundary, and extending from the boundary to above the first edge area and a part of the first display area adjacent to the boundary, and extending to above the second edge area and a part of the second display area adjacent to the boundary;
      a light emitting surface, opposite to the light entering surface and facing away from the boundary, extending along the boundary, and extending from the boundary to above the first edge area and the part of the first display area adjacent to the boundary, and extending to above the second edge area and the part of the second display area adjacent to the boundary;
      a first stairs-shaped surface, located above the part of the first display area adjacent to the boundary, and connecting the light entering surface and the light emitting surface; and
      a second stairs-shaped surface, located above the part of the second display area adjacent to the boundary, and connecting the light entering surface and the light emitting surface;
      wherein the first stairs-shaped surface of the strip-shaped lens comprises a plurality of first step surfaces, wherein each of the first step surfaces is parallel to the first display area and the second display area, and the second stairs-shaped surface of the strip-shaped lens comprises a plurality of second step surfaces, wherein each of the second step surfaces is parallel to the first display area and the second display area, and
      wherein at least a portion of a light beam emitted out from the first display area is directly incident into the strip-shaped lens through the first step surfaces, and at least a portion of a light beam emitted out from the second display area is directly incident into the strip-shaped lens through the second step surfaces.

2. The display apparatus as claimed in claim 1, wherein the first stairs-shaped surface and the second stairs-shaped surface are all complied with $0.1<w/h<10$, wherein w is a width of each of the first step surfaces and the second step surfaces along a direction parallel to the first display area and the second display area, and h is a height between the adjacent first step surfaces or the adjacent second step surfaces along a direction perpendicular to the first display area and the second display area.

3. The display apparatus as claimed in claim 1, wherein the first stairs-shaped surface further comprises a plurality of first connection surfaces connected between the first step surfaces, and the second stairs-shaped surface further comprises a plurality of second connection surfaces connected between the second step surfaces.

4. The display apparatus as claimed in claim 1, wherein the light entering surface comprising:
   a first curved convex, extending from a place adjacent to the boundary to above the first edge area and the part of the first display area adjacent to the boundary; and
   a second curved convex, extending from a place adjacent to the boundary to above the second edge area and the part of the second display area adjacent to the boundary, wherein a notch is formed between the first curved convex and the second curved convex.

5. The display apparatus as claimed in claim 1, wherein the light emitting surface comprises:
   a third curved convex, extending from a place adjacent to the boundary to above the first edge area and the part of the first display area adjacent to the boundary; and
   a fourth curved convex, extending from a place adjacent to the boundary to above the second edge area and the part of the second display area adjacent to the boundary, wherein a notch is formed between the third curved convex and the fourth curved convex.

6. The display apparatus as claimed in claim 1, wherein the strip-shaped lens further comprises a support portion connected to the light entering surface and leaning against the boundary.

7. The display apparatus as claimed in claim 6, wherein the support portion and the strip-shaped lens are formed integrally.

8. The display apparatus as claimed in claim 1, wherein an area of an orthogonal projection of the light emitting surface on a plane containing the first display area and the second display area is larger than and covers an area of an orthogonal projection of the light entering surface on the plane.

9. The display apparatus as claimed in claim 1, wherein the strip-shaped lens has a buckle structure for connecting at least one of the first edge area and the second edge area.

10. The display apparatus as claimed in claim 1, wherein the strip-shaped lens is configured with a magnetic unit for connecting at least one of the first edge area and the second edge area through a magnetic force.

11. The display apparatus as claimed in claim 1, wherein the light emitting surface is a plane.

12. A strip-shaped lens, comprising:
a light entering surface, facing a reference line and located above the reference line, containing a first notch, and extending from the first notch to two sides of the first notch, wherein the reference line is positioned outside the strip-shaped lens;
a light emitting surface, opposite to the light entering surface and facing away from the reference line, containing a center line, and extending from the center line to the two sides of the center line;
a first stairs-shaped surface, connecting the light entering surface and the light emitting surface; and
a second stairs-shaped surface, connecting the light entering surface and the light emitting surface;
wherein all the reference line, the first notch, and the center line lie in a first reference plane and the reference line, the first notch, and the center line are parallel to one another, and the first notch lies between the reference line and the center line; and the first reference plane and a second reference plane perpendicular to each other intersect in the reference line; and
wherein the first stairs-shaped surface comprises a plurality of first step surfaces, wherein each of the first step surfaces is parallel to the second reference plane, and the second stairs-shaped surface comprises a plurality of second step surfaces, wherein each of the second step surfaces is parallel to the second reference plane, and
wherein the first step surfaces and the second step surfaces are facing the second reference plane.

13. The strip-shaped lens as claimed in claim 12, wherein the first stairs-shaped surface and the second stairs-shaped surface are all complied with $0.1<w/h<10$, wherein w is a width of each of the first step surfaces and the second step surfaces along a direction perpendicular to the first reference plane, and h is height between the adjacent first step surfaces or the adjacent second step surfaces along a direction parallel to the first reference plane and perpendicular to the reference line.

14. The strip-shaped lens as claimed in claim 12, wherein the first stairs-shaped surface further comprises a plurality of first connection surfaces connected between the first step surfaces, and the second stairs-shaped surface further comprises a plurality of second connection surfaces connected between the second step surfaces.

15. The strip-shaped lens as claimed in claim 12, wherein the light entering surface comprises:
a first curved convex, extending from above the reference line towards a first direction; and
a second curved convex, extending from above the reference line towards a second direction, wherein the first direction is opposite to the second direction, and a notch is formed between the first curved convex and the second curved convex.

16. The strip-shaped lens as claimed in claim 12, wherein the light emitting surface comprises:
a third curved convex, extending from above the reference line towards a first direction; and
a fourth curved convex, extending from above the reference line towards a second direction, wherein the first direction is opposite to the second direction, and a notch is formed between the third curved convex and the fourth curved convex.

17. The strip-shaped lens as claimed in claim 12, further comprising:
a support portion, connected to the light entering surface, and extending towards the reference line.

18. The strip-shaped lens as claimed in claim 17, wherein the support portion and the strip-shaped lens are formed integrally.

19. The strip-shaped lens as claimed in claim 12, wherein the light emitting surface has a center line, the first reference plane comprises the center line and the reference line, the second reference plane comprises the reference line and is perpendicular to the first reference plane, and an area of an orthogonal projection of the light emitting surface on the second reference plane is larger than and covers an area of an orthogonal projection of the light entering surface on the second reference plane.

20. The strip-shaped lens as claimed in claim 12, wherein the strip-shaped lens has a buckle structure.

21. The strip-shaped lens as claimed in claim 12, wherein the strip-shaped lens is configured with a magnetic unit.

22. The strip-shaped lens as claimed in claim 12, wherein the light emitting surface is a plane.

* * * * *